Patented Feb. 10, 1925.

1,526,300

UNITED STATES PATENT OFFICE.

LORIN B. SEBRELL, OF AKRON, OHIO, ASSIGNOR TO THE GOODYEAR TIRE & RUBBER COMPANY, OF AKRON, OHIO, A CORPORATION OF OHIO.

METHOD OF VULCANIZING CAOUTCHOUC AND PRODUCTS OBTAINED THEREBY.

No Drawing.     Application filed February 9, 1924. Serial No. 691,853.

*To all whom it may concern:*

Be it known that I, LORIN B. SEBRELL, a citizen of the United States, and resident of Akron, Ohio, have invented new and useful Improvements in Methods of Vulcanizing Caoutchouc and Products Obtained Thereby, of which the following is a specification.

My invention relates to the vulcanizing of rubber and rubber compounds, and it has for its primary object, the provision of an accelerator which shall materially increase the rate of vulcanization of rubber compounds associated therewith and insure products of high quality.

It is, of course, well known that accelerators are highly desirable in the vulcanization of rubber, inasmuch as such process may be expedited and advantages be obtained in the physical properties of the rubber. Since the function of accelerators is now well understood by those familiar with the art, it does not appear necessary to set forth a detailed discussion of advantages and the desirability already recognized in the utilization of such ingredients.

The present invention is primarily concerned with disclosing an accelerator having such characteristics as to recommend it for general application in the rubber industry. It has been found that certain pentathiophenes insure satisfactory results when compounded in rubber mixes. For example, 2-6-dimercapto-3-5-diphenyl-4-oxypentathiophene, having the structural formula

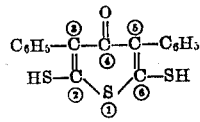

is a desirable accelerator. The compound is named and numbered in accordance with the modern form of nomenclature, which will be better understood by reference to the structural formula.

The foregoing accelerator may be embodied in a rubber mixture containing the following ingredients:

|  | Parts. |
|---|---|
| Rubber | 50 |
| Zinc oxide | 2.5 |
| Sulfur | 3 |
| 2-6-dimercapto-3-5-diphenyl-4-oxypentathiophene | .5 |

A good cure may be obtained in the foregoing compound, if it is subjected to heat, at a temperature corresponding to 40 pounds of steam pressure, for 45 minutes to an hour. The product will have a tensile strength of approximately 200 kgs. per sq. cm., with an elongation of 900%.

If litharge is substituted for zinc oxide in the above rubber mix, the time of cure is reduced to substantially 30 minutes, with approximately the same physical properties of tensile strength and elongation.

It appears from tests that the accelerator, above described, may be utilized to best advantage when employed with a metallic oxide or a metallic salt, in a physical combination therewith, which may be obtained by merely mixing the salt or oxide with the accelerator. Examples of metallic oxides have been mentioned in the foregoing examples specifying litharge and zinc oxide, and the metallic salts that may be employed are lead acetate, lead stearate, zinc acetate, zinc stearate, zinc benzoate, or lead or zinc salts of other organic acids.

As examples of compounds employing metallic salts, the following mixtures may be used.

|  | Parts. |
|---|---|
| Rubber | 100 |
| Sulfur | 6 |
| Zinc stearate | 5 |
| 2-6-dimercapto-3-5-diphenyl-4-oxypentathiophene | 1 |

A good cure may be obtained in one hour at a temperature corresponding to 40 lbs. of steam pressure, producing a stock having approximately a tensile strength of 148 kgs. per sq. cm. with an elongation of 865%.

|  | Parts. |
|---|---|
| Rubber | 100 |
| Gas black | 36 |
| Sulfur | 6 |
| Pb. acetate | 5 |
| 2-6-dimercapto-3-5-diphenyl-4-oxypentathiophene | 1 |

After being subjected to heat for 30 to 40 minutes, at a temperature corresponding to 40 lbs. of steam pressure, the latter mix resulted in a product having a tensile strength of 246 kgs. per sq. cm. with an elongation of 620%.

It should be noted, also, that a salt formed by the reaction of 2-6-dimercapto-3-5-diphenyl-4-oxypentathiophene with a bivalent metal, such as zinc or lead, is also a good accelerator. The latter accelerator may also be employed with the metallic oxides or the metallic salts, which serve as activators thereof in the same manner as when physically combined with 2-6-dimercapto-3-5-diphenyl-4-oxypentathiophene alone.

A derivative of the accelerator above mentioned, that also provides satisfactory results, may be found in 2-6-dimercapto-3-5-dimethyl-4-oxypentathiophene, having the structural formula

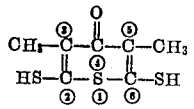

which is numbered as in the previous example. The latter accelerator is preferably utilized with metallic oxides or metallic salts, which serve as activators therefor and improve its operating characteristics to a material extent. Furthermore, a salt formed by a reaction of 2-6-dimercapto-3-5-dimethyl-4-oxypentathiophene with a salt of a bivalent metal, such as zinc or lead, may also be employed with the metallic oxides or salts, to accelerate the vulcanization of a rubber compound.

Although I have specifically named a plurality of compounds, and activators therefor, that may be utilized as accelerators in accordance with my invention, it is obvious that minor changes may be introduced in the method of employing the ingredients, and that a selection of other elements may be suggested thereby, without departing from the spirit or scope of the invention, and I desire, therefore, that no limitations shall be imposed, except such as are indicated in the appended claims.

What I claim is:

1. A caoutchouc mixture containing before vulcanization a compound having the general formula:

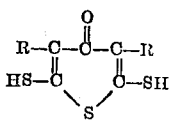

2. A method of accelerating the vulcanization of caoutchouc by vulcanizing the same in the presence of a compound having the general formula:

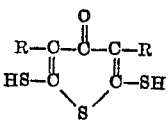

3. A method of vulvanizing caoutchouc that comprises admixing caoutchouc with a vulcanizing agent, incorporating a compound therein having the general formula:

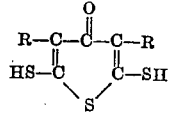

4. A method of vulcanizing caoutchouc that comprises admixing caoutchouc with a vulcanizing agent, incorporating 2-6-dimercapto-3-5-diphenyl-4-oxypentathiophene in the mixture mixing an activator therewith and applying heat thereto.

5. A method of vulcanizing caoutchouc that comprises admixing caoutchouc with a vulcanizing agent, incorporating 2-6-dimercapto-3-5-diphenyl-4-oxypentathiophene in the mixture, mixing litharge therewith and applying heat thereto.

6. A method of vulcanizing caoutchouc that comprises admixing caoutchouc with a vulcanizing agent, incorporating 2-6-dimercapto-3-5-diphenyl-4-oxypentathiophene in the mixture, mixing zinc oxide therewith and applying heat thereto.

7. A method of vulcanizing caoutchouc that comprises admixing caoutchouc with a vulcanizing agent, incorporating 2-6-dimercapto-3-5-diphenyl-4-oxypentathiophene in the mixture, mixing lead acetate therewith and applying heat thereto.

8. A method of vulcanizing caoutchouc that comprises admixing caoutchouc with a vulcanizing agent, incorporating 2-6-dimercapto-3-5-diphenyl-4-oxypentathiophene in the mixture, mixing zinc acetate therewith and applying heat thereto.

9. A method of vulcanizing caoutchouc that comprises admixing caoutchouc with a vulcanizing agent, incorporating a metallic derivative of 2-6-dimercapto-3-5-diphenyl-4-oxypentathiophene mixing an activator therewith and applying heat thereto.

10. A method of vulcanizing caoutchouc that comprises admixing caoutchouc with a vulvanizing agent, mixing 2-6-dimercapto-3-5-dimethyl-4-oxypentathiophene therewith, adding an activator to the mixture and applying heat thereto.

11. A method of vulcanizing caoutchouc that comprises admixing caoutchouc with a vulcanizing agent, mixing 2-6-dimercapto-3-5-dimethyl-4-oxypentathiophene therewith, adding litharge to the mixture and applying heat thereto.

12. A method of vulcanizing caoutchouc that comprises admixing caoutchouc with a vulcanizing agent, incorporating a metallic derivative of 2-6-dimercapto-3-5-dimethyl-4-oxypentathiophene, admixing an activator therewith and applying heat thereto.

13. A vulcanized caoutchouc product formed by the reaction of caoutchouc, a vulcanizing agent, 2-6-dimercapto-3-5-diphenyl-4-oxypentathiophene, and an activator.

14. A vulcanized caoutchouc product formed by the reaction of caoutchouc, a vulcanizing agent, 2-6-dimercapto-3-5-diphenyl-4-oxypentathiophene, and litharge.

15. A vulcanized caoutchouc product formed by the reaction of caoutchouc, a vulcanizing agent, 2-6-dimercapto-3-5-diphenyl-4-oxypentathiophene, and lead acetate.

16. A vulcanized caoutchouc product formed by the reaction of caoutchouc, a vulcanizing agent, a metallic salt of 2-6-dimercapto-3-5-diphenyl-4-oxypentathiophene, and litharge.

17. A vulcanized caoutchouc product formed by the reaction of caoutchouc, a vulcanizing agent, 2-6-dimercapto-3-5-dimethyl-4-oxypentathiophene, and litharge.

18. A vulcanized caoutchouc product formed by the reaction of caoutchouc, a vulcanizing agent, 2-6-dimercapto-3-5-dimethyl-4-oxypentathiophene, and lead acetate.

In witness whereof, I have hereunto signed my name in the presence of two subscribing witnesses.

LORIN B. SEBRELL.

Witnesses:
O. E. BEE,
CARITA HARRIS.